(12) United States Patent
Vielcanet et al.

(10) Patent No.: US 10,677,095 B2
(45) Date of Patent: Jun. 9, 2020

(54) LUBRICATION DEVICE FOR A TURBINE ENGINE

(71) Applicant: Safran Aircraft Engines, Paris (FR)

(72) Inventors: Jérémy Vielcanet, Moissy-Cramayel (FR); Caroline Frantz, Moissy-Cramayel (FR); David Simon, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 672 days.

(21) Appl. No.: 15/316,751

(22) PCT Filed: Jun. 11, 2015

(86) PCT No.: PCT/FR2015/051552
§ 371 (c)(1),
(2) Date: Dec. 6, 2016

(87) PCT Pub. No.: WO2015/189524
PCT Pub. Date: Dec. 17, 2015

(65) Prior Publication Data
US 2017/0198605 A1  Jul. 13, 2017

(30) Foreign Application Priority Data
Jun. 11, 2014 (FR) ..................................... 14 55292

(51) Int. Cl.
*F01D 25/20* (2006.01)
*F01M 1/16* (2006.01)
*F02K 3/072* (2006.01)
*F02C 7/06* (2006.01)
(Continued)

(52) U.S. Cl.
CPC ............ *F01D 25/20* (2013.01); *B64C 11/308* (2013.01); *F01D 5/02* (2013.01); *F01D 15/12* (2013.01);
(Continued)

(58) Field of Classification Search
CPC . F01D 25/18; F01D 25/20; F01D 5/02; F01D 15/12; F02C 7/06; F02C 7/32;
(Continued)

(56) References Cited

U.S. PATENT DOCUMENTS 2,317,745 A * 4/1943 Duckstein ............... F16N 23/00
                                                   123/196 R
2,964,132 A    12/1960 Atkinson et al.
(Continued)

FOREIGN PATENT DOCUMENTS

| EP | 1 048 842 A2 | 11/2000 |
| EP | 1 531 271 A2 | 5/2005 |
| FR | 2 940 247 A1 | 6/2010 |

*Primary Examiner* — Alain Chau
(74) *Attorney, Agent, or Firm* — Blank Rome LLP

(57) ABSTRACT

The invention relates to a lubrication device for a turbine engine, comprising an oil intake pipe (23) provided with a pump (24) for supplying oil and control means (25) located downstream from the supply pump (24), a supply pipe (26) intended for supplying oil to a member to be lubricated and a recirculation pipe (27), the control means (25) making it possible to direct all or part of the flow of oil from the intake pipe (23) towards the supply pipe (26) and/or towards the recirculation pipe (27), the pump (24) being driven by at least one rotary member of an accessory gearbox of the turbine engine.

9 Claims, 4 Drawing Sheets

(51) Int. Cl.
*B64C 11/30* (2006.01)
*F16N 27/00* (2006.01)
*F16N 7/40* (2006.01)
*F01D 25/18* (2006.01)
*F01D 5/02* (2006.01)
*F01D 15/12* (2006.01)
*F04D 29/053* (2006.01)
*F04D 29/32* (2006.01)
*B64D 27/00* (2006.01)

(52) U.S. Cl.
CPC ............... *F01D 25/18* (2013.01); *F01M 1/16* (2013.01); *F02C 7/06* (2013.01); *F02K 3/072* (2013.01); *F04D 29/053* (2013.01); *F04D 29/321* (2013.01); *F16N 7/40* (2013.01); *F16N 27/00* (2013.01); *B64D 2027/005* (2013.01); *F05D 2220/30* (2013.01); *F05D 2220/325* (2013.01); *F05D 2260/40311* (2013.01); *F05D 2260/98* (2013.01); *F05D 2270/3015* (2013.01); *F05D 2270/3062* (2013.01); *F16N 2210/02* (2013.01); *F16N 2270/20* (2013.01); *F16N 2270/60* (2013.01); *Y02T 50/66* (2013.01)

(58) Field of Classification Search
CPC . F02K 3/072; F01M 1/16; F01M 1/12; F01M 1/20; F16N 2210/02; F16N 2210/08; F16N 7/38; F16N 7/40; F16N 2270/20; F16N 2270/60; F16N 27/00; F16N 29/02; F05D 2260/98; F05D 2260/40311; F05D 2240/50; F05D 2220/325; F05D 2270/3015; F05D 2270/3062; B64C 11/308; F04D 29/053; B64D 2027/005
See application file for complete search history.

(56) References Cited

U.S. PATENT DOCUMENTS

| | | | | |
|---|---|---|---|---|
| 2,991,845 | A * | 7/1961 | Scheffler, Jr. | F01D 25/20 184/6.13 |
| 3,477,545 | A * | 11/1969 | Durnan | F16N 27/00 184/6.4 |
| 3,477,546 | A * | 11/1969 | Gruber | F16N 25/02 184/6 |
| 3,486,582 | A * | 12/1969 | Carter | F01D 25/20 184/6.3 |
| 3,861,139 | A * | 1/1975 | Jones | F02C 3/067 60/226.1 |
| 4,245,465 | A * | 1/1981 | Milo | F16N 27/00 184/6.11 |
| 5,023,789 | A * | 6/1991 | Lampe | F16D 25/123 192/82 T |
| 5,067,454 | A | 11/1991 | Waddington et al. | |
| 5,217,085 | A * | 6/1993 | Barrie | F01M 1/16 165/297 |
| 5,896,737 | A * | 4/1999 | Dyer | F02C 9/263 60/39.281 |
| 6,058,694 | A | 5/2000 | Ackerman et al. | |
| 6,321,527 | B1 | 11/2001 | Dyer et al. | |
| 6,896,489 | B2 * | 5/2005 | Hunter | F01C 21/0836 417/220 |
| 8,485,222 | B2 * | 7/2013 | Restivo | F16N 7/40 123/196 R |
| 8,578,967 | B2 * | 11/2013 | Vinski | F02C 7/232 137/625.48 |
| 8,672,632 | B2 * | 3/2014 | Swift | F02K 3/062 416/154 |
| 8,959,920 | B2 * | 2/2015 | Clements | F02C 7/06 60/734 |
| 9,441,786 | B2 * | 9/2016 | Streifinger | F01D 25/002 |
| 2005/0100447 | A1 * | 5/2005 | Desai | F04B 1/26 417/220 |
| 2006/0260323 | A1 * | 11/2006 | Moulebhar | F01D 21/003 60/793 |
| 2008/0178833 | A1 | 7/2008 | Restivo et al. | |
| 2009/0071754 | A1 * | 3/2009 | McArthur | F16N 7/38 184/7.4 |
| 2011/0164978 | A1 * | 7/2011 | Swift | F02K 3/062 416/147 |
| 2013/0032215 | A1 * | 2/2013 | Streifinger | F01D 25/002 137/1 |
| 2013/0269365 | A1 * | 10/2013 | Clements | F02C 7/06 60/783 |

* cited by examiner

LUBRICATION DEVICE FOR A TURBINE ENGINE

TECHNICAL FIELD

The present invention relates to a lubrication device for a turbine engine, such as for instance the turbine engine on a plane.

BACKGROUND

The invention more particularly applies to an <<open rotor>> turbine engine, i.e. comprising an unducted fan.

Such a turbine engine, more particularly known from the patent application FR 2 940 247, conventionally comprises a high pressure body comprising a high pressure compressor and a high pressure turbine rotationally coupled by means of a first shaft and an additional body comprising a low pressure compressor and an intermediate pressure turbine rotationally coupled by means of a second shaft.

The turbine engine further comprises a free power turbine, forming a low pressure turbine and comprising a first rotor (or internal rotor) and a second rotor (or external rotor). The turbine engine also comprises a system of contra-rotating impellers, i.e. respectively a first impeller and a second impeller driven by the low pressure turbine via an epicyclic speed reduction gear. The impeller system also comprises a stator.

The epicyclic speed reduction gear more particularly comprises a planet gear rotating about an axis, meshing with planets about axes belonging to a planet carrier, with the planets meshing with a radially toothed external crown gear, itself supported by a crown gear shaft. The shaft of the crown gear is rotationally coupled with the second rotor. Besides, the shaft of the planet gear is rotationally coupled with the first rotor.

Additionally, the shaft of the planet carrier is rotationally coupled with the first impeller and the shaft of the crown gear is rotationally coupled with the second impeller.

The turbine engine comprises an oil system lubricating and cooling the epicyclic speed reduction gear and the bearings supporting the rotating parts. Such system comprises an oil intake pipe provided with a pump for supplying oil and if need be control means located downstream from the supply pump, a supply pipe intended for supplying oil to a member to be lubricated and a recirculation pipe connected upstream from the supply pump, with the control means making it possible to direct all or part of the flow of oil from the intake pipe towards the supply pipe and/or towards the recirculation pipe. The fixed-displacement pump is driven into rotation by a mobile member of an accessory gear box positioned close thereto, via a power shaft.

Considering the footprint constraints, connecting a power shaft (i.e. a shaft making it possible to transmit a relatively high torque, for instance ranging from 90 to 900 N.m) with a mobile member of the epicyclic speed reduction gear is relatively complicated. Now, driving into rotation such oil supply pump cannot be obtained but with a power shaft.

It is reminded that an accessory gear box, or A.G.B. comprises a box containing a certain number of gears connected to devices or accessories, such as, for instance an electric generator, a starter, an alternator, hydraulic fuel or oil pumps, etc. . . . To drive such various gears, the power of the turbine engine is partially taken off at the high pressure body through a power take-off shaft. The speed of rotation of the various mobile members of the accessory gear box directly depends on the speed of rotation of the high pressure body of the turbine engine.

On the contrary, the speed of rotation of the various mobile members of the epicyclic speed reduction gear is not directly dependent on the speed of rotation of the high pressure body, but is directly dependent on the speed of rotation of the rotors of the low pressure turbine. The oil requirements of the speed reduction gear are thus uncoupled from the speed of rotation of the high pressure body. The oil system, and more particularly the pump, has a capacity covering the maximum oil rate required, and thus supercharges the epicyclic speed reduction gear with oil out of the operation point for which the capacity of the pump has been designed. Such supercharging is combined with a limited capacity of discharging oil because of the speed reduction gear, more particularly at low rotation speed (oil discharge by centrifugal effect). The risk of flooding the speed reduction gear exists, which affects the operation, the performances and the service life thereof, generates heating and creates unbalance.

SUMMARY

The invention more particularly aims at providing a simple, efficient and cost-effective solution to this problem.

For this purpose, it provides for a lubrication device for a turbine engine, comprising an oil intake pipe provided with a pump for supplying oil and control means located downstream from the supply pump, a supply pipe intended for supplying oil to a member to be lubricated and a recirculation pipe connected upstream from the supply pump, with the control means making it possible to direct all or part of the flow of oil from the intake pipe towards the supply pipe and/or towards the recirculation pipe, with the pump being driven by at least one rotating member of an accessory gear box of the turbine engine, characterized in that the control means comprise a controlled metering valve comprising an inlet connected to the intake pipe and an outlet connected to the supply pipe, with the control means further comprising a control valve comprising an inlet connected to the intake pipe and an outlet connected to the recirculation pipe, with the position of the control valve being controlled according to the oil pressure at the metering valve inlet and outlet.

The pump is driven by at least one rotating member of the accessory gear box or A.G.B. for instance through a power shaft. It should be noted that, in the case of the A.G.B., the footprint constraints are not as high as in the case of the speed reduction gear. A high torque can thus be taken at the A.G.B. through a power shaft in order to drive the supply pump.

Besides, the metering valve may be controlled using a law which specifically takes into account the speed of rotation of a particular element, such as, for instance, the speed of rotation of one element of the speed reduction gear or the low-pressure turbine. Any underfeeding or overfeeding with oil of the member to be lubricated, the speed reduction gear, for instance, is thus prevented. The metering valve control law may also take into account other parameters of the turbine engine (temperature, rating, power, torque, other engine parameters, . . . ).

The control valve makes it possible to recirculate the oil flow, generated by the main pump, which is not required for lubricating the above-mentioned member.

According to one embodiment of the invention, the control valve may comprise a variable position piston, the position of which affects the oil flow at the outlet of the control valve, with said piston being adapted to be subjected to a first pressing force generated by applying a first pressure in a first pressure chamber of the control valve and a second pressing force, opposite the first pressing force, generated by applying a second pressure in a second pressure chamber of the control valve.

Then the device may comprise a first tapping pipe connecting the intake pipe or the inlet of the metering valve and the first pressure chamber, and a second tapping pipe connecting the supply pipe or the outlet of the metering valve and the second pressure chamber.

The control valve is thus controlled by the pressure difference between the metering valve outlet and inlet.

Besides, the control valve may include a return spring adapted to generate a return force on the piston, so as to maintain a constant difference in pressure between the metering valve outlet and inlet.

Besides, the metering valve may include at least one metering slot and a mobile member, the position of which is controlled, for instance using a servo-valve, and affects the oil flow at the metering valve outlet.

The oil flow at the outlet of the metering valve then depends on the position of said metering valve only. Controlling the later is thus relatively easy. The control law can thus be simply and reliably established. Such control law then gives the flow rate at the outlet of the metering valve depending on the position of said metering valve. In operation, the position of the control valve then automatically adapts to redirect a portion of the oil flow to the recirculation pipe.

The recirculation pipe may open into the intake pipe, upstream from the supply pump.

As an alternative solution, the device comprises an oil recovery pipe adapted to recover the oil from the member to be lubricated for example, with said recovery pipe being provided with a recovery pump, with the recirculation pipe opening into the recovery pipe downstream from the recovery pump.

Besides, the metering valve may comprise a mobile member, the position of which affects the oil flow at the outlet of said metering valve, with said position of the mobile member being measured by a sensor and controlled by a control law establishing a relationship between the set oil flow at the outlet and the measured position of the mobile member, with the device comprising means for measuring the temperature of the oil going through the metering valve, with said control law taking the temperature of the measured oil into account.

The invention also relates to a turbine engine comprising a lubrication device of the type mentioned above, a first and a second contra-rotating impellers driven into rotation by a low pressure turbine, through an optionally epicyclic speed reduction gear, with the supply pipe being intended to supply the speed reduction gear with oil.

The turbine engine may then comprise a high pressure body comprising a high pressure compressor and a high pressure turbine rotationally coupled by a first shaft, and an additional body comprising a low pressure compressor and an intermediate pressure turbine, rotationally coupled by a second shaft, with the speed of rotation of the accessory gear box rotating member depending on (being a multiple of) the speed of rotation of the shaft of the high pressure body.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION

Figure 1:
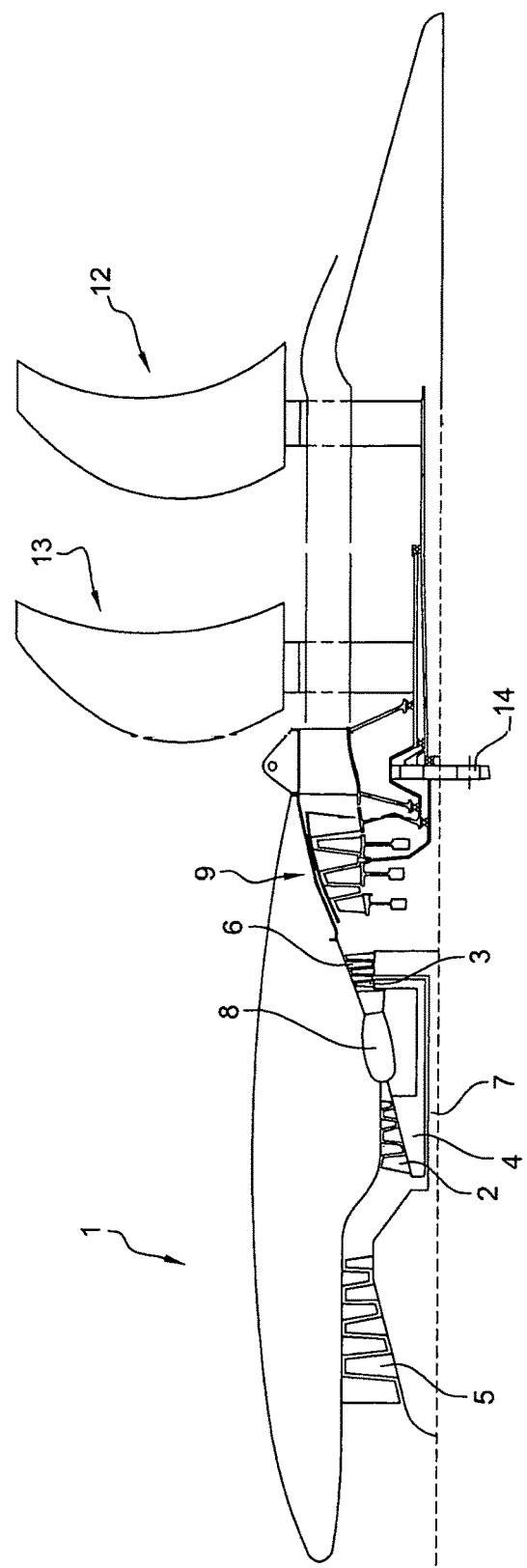
FIG. 1 is a half-view, in longitudinal cross-section, of a turbine engine with an unducted fan according to the invention.
Figure 2:
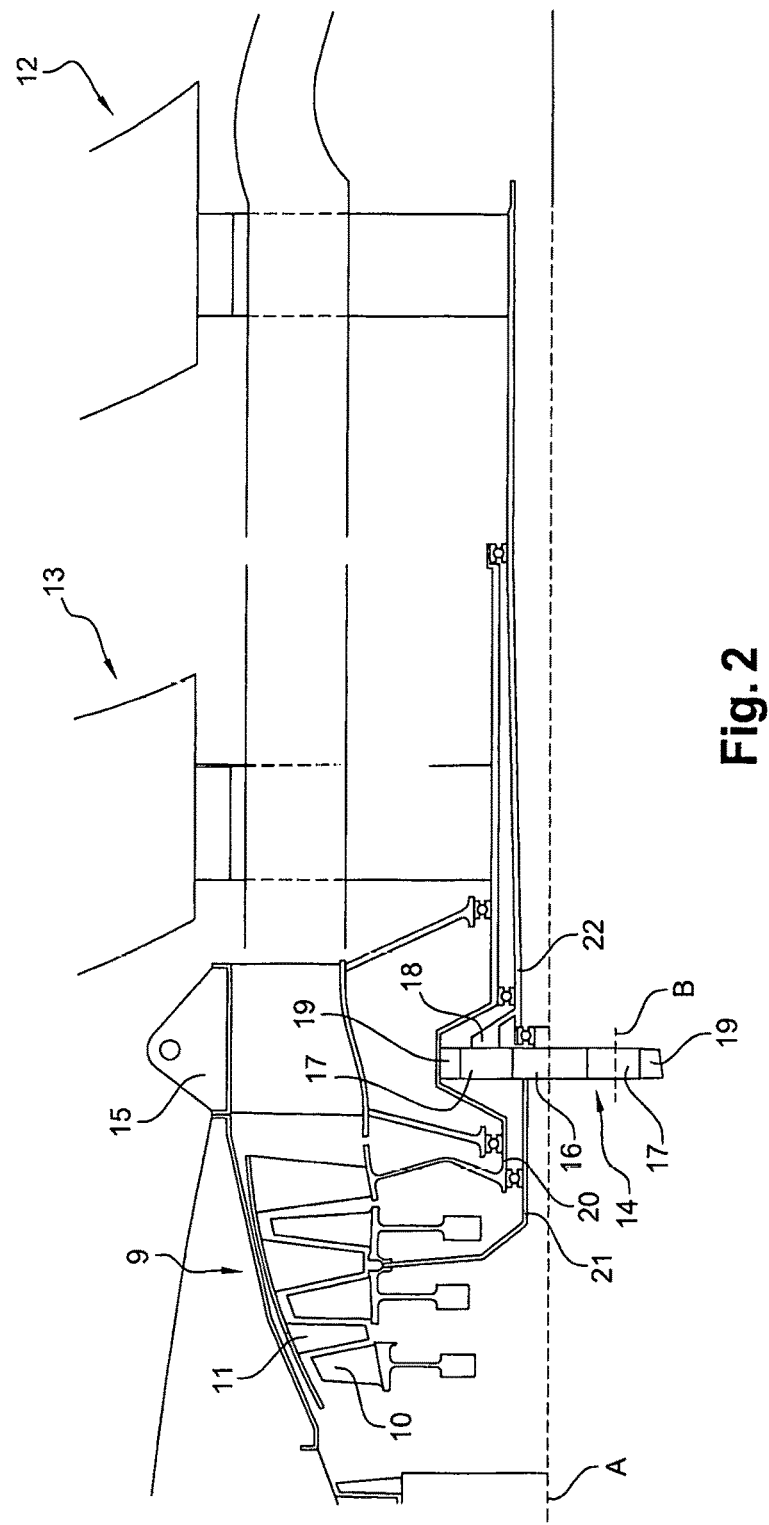
FIG. 2 is a detailed view of a part of FIG. 1.

FIGS. 1 and 2 show a so-called <<open rotor>> turbine engine with an unducted fan. The latter comprises a high pressure body comprising a high pressure compressor 2 and a high pressure turbine 3 rotationally coupled by means of a first shaft 4 and an additional body comprising a low pressure compressor 5 and an intermediate pressure turbine 6 rotationally coupled by means of a second shaft 7. A combustion chamber 8 is positioned between the high pressure compressor 2 and the high pressure turbine 3.

The turbine engine 1 further comprises a free power turbine 9, forming a low pressure turbine and comprising a first rotor 10 (or internal rotor) and a second rotor 11 (or external rotor), to be seen in FIG. 2. The turbine engine 1 also comprises a system of contra-rotating impellers, i.e. a first impeller 12 and a second impeller 13 respectively driven by the low pressure turbine 9 via an epicyclic speed reduction gear 14. The impeller system also comprises a stator 15.

The epicyclic speed reduction gear 14 more particularly comprises a planet gear 16 rotating about the axis A of the turbine engine, meshing with planets 17 about axes B belonging to a planet carrier 18, with the planets 17 meshing with a radially toothed external crown gear 19, itself supported by a crown gear shaft 20. The shaft 20 of the crown gear 19 is rotationally coupled with the second rotor 11. Besides, the shaft 21 of the planet gear 16 is rotationally coupled with the first rotor 10.

Besides, the shaft 22 of the planet carrier 18 is rotationally coupled with the first impeller 12 and the shaft 20 of the crown gear is rotationally coupled with the second impeller 13.

The turbine engine 1 comprises an oil system more particularly providing lubrication and cooling of the epicyclic speed reduction gear 14. Such system conventionally comprises an oil intake pipe 23 connected upstream with a tank and provided with a pump 24 for supplying oil and control means 25 located downstream from the supply pump 24, a supply pipe 26 intended to supply oil to the speed reduction gear 14 and a recirculation pipe 27 opening upstream from the supply pump 24, with the control means 25 making it possible to direct all or part of the flow of oil from the intake pipe 23 towards the supply pipe 26 and/or towards the recirculation pipe 27.

The fixed-displacement pump 24 is driven into rotation by a mobile member of an accessory gear box (not shown), positioned close thereto, via a power shaft 28. As seen above, the speed of rotation of the various mobile members of the accessory gear box directly depends on (i.e. is a multiple of) the speed of rotation of the high pressure body of the turbine engine.

Figure 3:
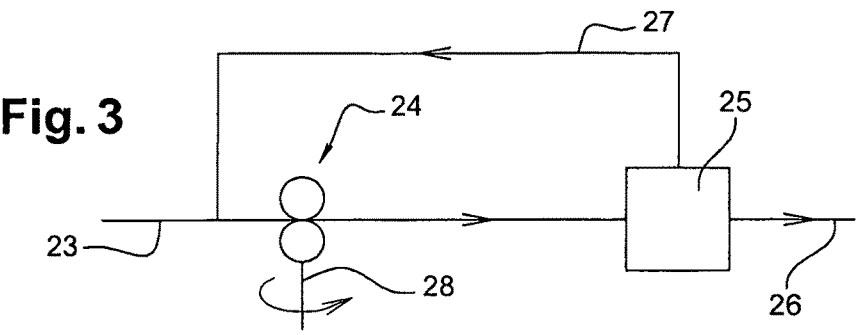
FIG. 3 is a schematic view of a lubrication device according to the invention.
Figure 4:
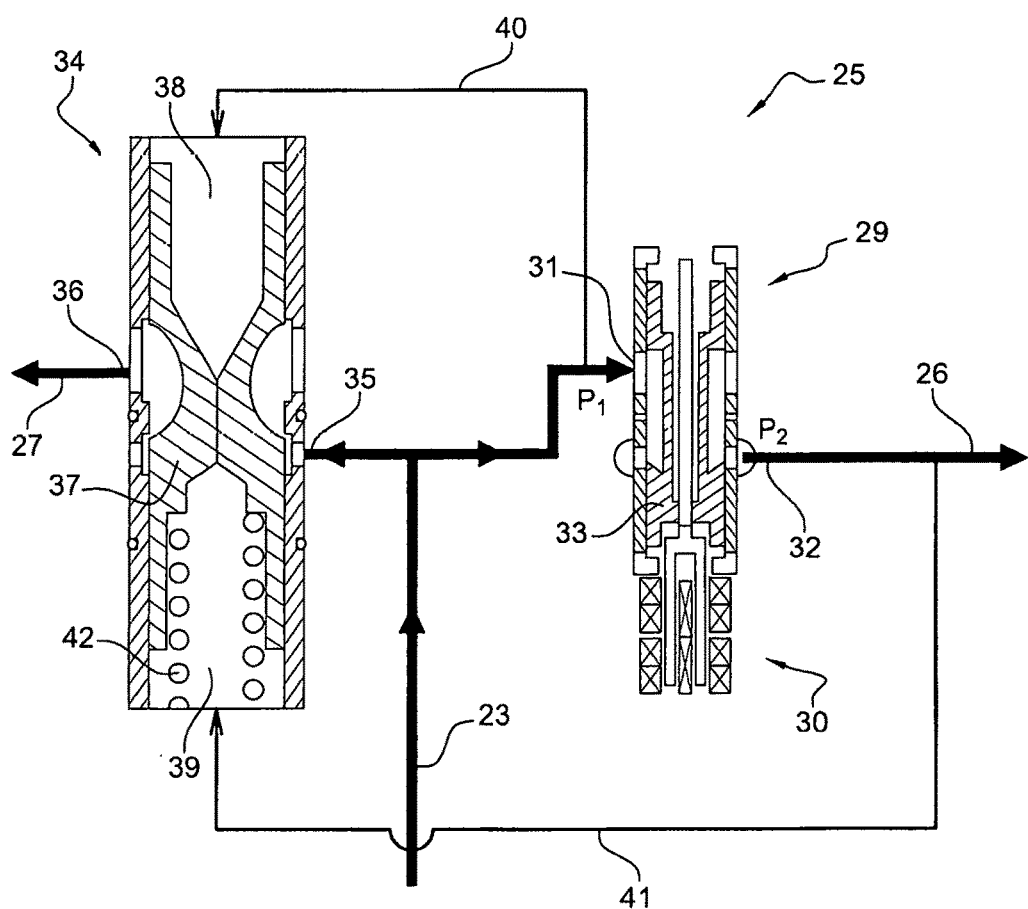
FIG. 4 is a schematic view of a portion of a lubrication device according to the invention.

As best seen in FIG. 3, the control means 25 comprise a metering valve 29 controlled by a servo-valve, for instance, with such metering valve comprising an inlet 31 connected to the intake pipe 23 and an outlet 32 connected to the supply pipe 26.

The oil pressure at the inlet 31 of the metering valve 29 is referenced P1 and the pressure at the outlet 32 of the metering valve 29 is referenced P2.

The control valve 34 is so designed as to maintain a pressure difference P1-P2 substantially constant at the ports of the metering valve 29 (except for transient speed, if need be). The oil flow at the outlet 32 of the metering valve 29 then depends on the position of said metering valve only. The means for controlling the metering valve 29 may include a control loop taking account of a measure of the valve 29 position and/or a measure of the oil flow at the outlet 32 of the metering valve 29.

The metering valve 29 comprises metering slots or apertures as well as a mobile member 33, the position of which affects the flow of fluid at the outlet 32 of said metering valve 29. An easily determined, for instance exponential, linear or discrete law can thus be obtained, between the flow of oil at the outlet 32 of the metering valve 29, and the position of the mobile member 33. Such position can be detected using a sensor 30 of the LvDT type, for instance.

It should be noted that oil is a fluid with a relatively high viscosity, as well as a high viscosity variation, depending on temperature. The feature giving the flow rate at the outlet 32 of the metering valve 29 according to the position of the mobile member 33 is thus substantially modified by the oil temperature, which affects the accuracy in metering the oil flow through the metering valve 29. It should be noted, for instance, that viscosity varies by a 17 factor for type II oil, from 20° C. to 120° C. Oil temperature should then preferably be taken into account in the control law of the metering valve 29.

Besides, the need for oil of the speed reduction gear 14 actually depends on the speed of rotation thereof, at the low speed of the turbine engine, and on the thermal rejections at the high speed of the turbine engine. The rating, the oil temperature and/or the speed of rotation of one element of the speed reduction gear 14 should also be taken into account in the metering valve 29 control law.

The control means further comprise a control valve 34 with an inlet 35 connected to the intake pipe 23 and an outlet 36 connected to the recirculation pipe 27.

The control valve 34 more particularly comprises a piston 37, the position of which affects the oil flow at the outlet of the control valve 34, with said piston 37 being adapted to be subjected to a first pressing force generated by applying a first pressure P1 in a first pressure chamber 38 of the control valve and a second pressing force, opposite the first pressing force, generated by applying a second pressure P2 in a second pressure chamber 39 of the control valve 34.

A first tapping pipe 40 connects the intake pipe or the inlet 31 of the metering valve 29 and the first pressure chamber 38, and a second tapping pipe 41 connects the supply pipe 26 or the outlet 32 of the metering valve 29 and the second pressure chamber 39.

The first pressure chamber 38 is thus subjected to pressure P1 and the second pressure chamber 39 is subjected to pressure P2. The first pressing force depends on pressure P1 and the surface of application S1 of the pressure P1. The second pressing force depends on pressure P2 and the surface of application S2 of the pressure P2.

The control valve 34 further comprises a return spring 42 mounted in the second pressure chamber 39 and adapted to generate a return force on the piston 37, opposite the first pressing force.

The control valve 34 is so dimensioned that the piston 37 stroke and the return spring 42 stiffness are weak, so as to regulate a pressure difference Pl-P2, which is substantially constant.

It should be noted that the end 35 and/or the outlet 36 do not open into any pressure chambers 38, 39, and that the tapping pipes 40, 41 open into said pressure chambers 38, 39.

Regulating the flow of oil intended to supply the speed reduction gear 14 makes it possible to prevent any damage to said speed reduction gear 14 further to a flooding thereof in operation, for instance, and to optimize the performances and thermal stresses of said speed reduction gear 14.

Figure 5:
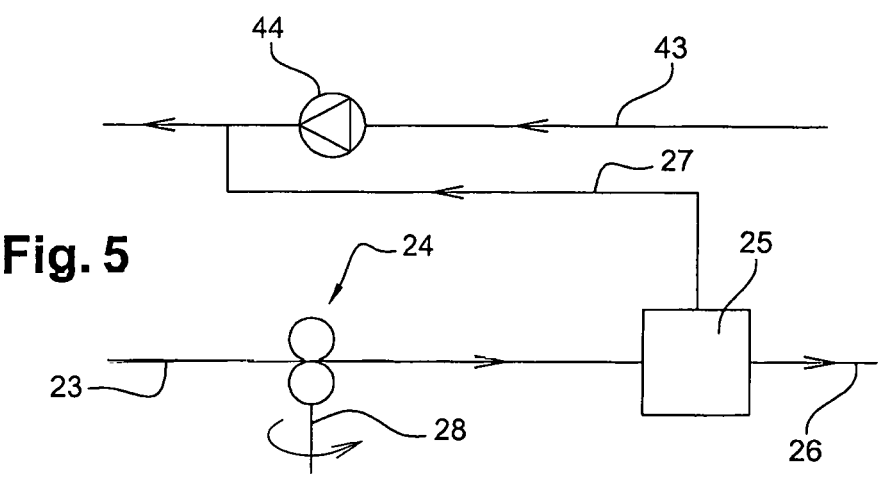
FIG. 5 is a schematic view of a lubrication device according to an alternative embodiment of the invention.

FIG. 5 shows an alternative embodiment of the invention which is different from the one disclosed above in that the lubrication device comprises an oil recovery pipe 43 adapted to recover oil from the speed reduction gear 14. The recovery pipe 43 is provided with a recovery pump 44. In this alternative solution, the recirculation pipe 27 opens into the recovery pipe 43, downstream from the recovery pump 44, relative to the oil flow direction.

The lubrication device according to the invention may of course be used for supplying with oil other members to be lubricated, such as rolling bearings of the turbine engine, for instance.

What is claimed is:

1. A lubrication device for a turbine engine, comprising an oil intake pipe provided with a supply pump for supplying oil and control means located downstream from the supply pump, a supply pipe intended for supplying oil to a member to be lubricated and an oil recirculation pipe, with the control means configured to direct all or part of the flow of oil from the intake pipe towards the supply pipe and/or towards the recirculation pipe, with the supply pump being driven by at least one rotary member of an accessory gearbox of the turbine engine, wherein the control means comprise a controlled metering valve having an inlet connected to the intake pipe and an outlet connected to the supply pipe, with the control means further comprising a control valve comprising an inlet connected to the intake pipe and an outlet connected to the recirculation pipe, with the position of the control valve being controlled by first and second oil pressures from the inlet and the outlet of the metering valve respectively, and wherein the control valve comprises a variable position piston, the position of which affects the oil flow at the outlet of the control valve, with said piston being adapted to be subjected to a first pressing force generated by applying the first oil pressure in a first pressure chamber of the control valve and a second pressing force, opposite the first pressing force, generated by applying the second oil pressure in a second pressure chamber of the control valve; and wherein the metering valve comprises a mobile member, the position of which affects the oil flow at the outlet of said metering valve, with said position of the mobile member being measured by a sensor, the control means further configured to control said position of the mobile member by using a control law establishing a relationship between a set oil flow at the outlet of the metering valve, the measured position of the mobile member, and a temperature of the oil flow going through the metering valve as measured by a means for measuring the temperature of the oil flow through the metering valve.

2. The lubrication device according to claim 1, further comprising a first tapping pipe connecting the intake pipe or the inlet of the metering valve and the first pressure chamber, and a second tapping pipe connecting the supply pipe or the outlet of the metering valve and the second pressure chamber.

3. The lubrication device according to claim 1, wherein the control valve comprises a return spring adapted to generate a return force on the piston.

4. The lubrication device according to claim 1, wherein the metering valve comprises at least one metering slot.

5. The lubrication device according to claim 1, wherein the control valve is so dimensioned and controlled as to maintain a constant pressure difference between the outlet and the inlet of the metering valve.

6. The lubrication device according to claim 1, wherein the recirculation pipe opens into the intake pipe upstream from the supply pump.

7. The lubrication device according to claim 1, further comprising an oil recovery pipe adapted to recover the oil from the member to be lubricated, with said recovery pipe being provided with a recovery pump, with the recirculation pipe opening into the recovery pipe downstream from the recovery pump.

8. A turbine engine comprising the lubrication device according to claim 1, a first and a second counter-rotating impellers driven into rotation by a low pressure turbine, through an epicyclic speed reduction gear, with the supply pipe being intended to supply the speed reduction gear with oil.

9. The turbine engine according to claim 8, further comprising a high pressure body comprising a high pressure compressor and a high pressure turbine rotationally coupled by a first shaft, and an additional body comprising a low pressure compressor and an intermediate pressure turbine, rotationally coupled by a second shaft, with the speed of rotation of the at least one rotary member of the accessory gear box depending on the speed of rotation of the first shaft of the high pressure body.

\* \* \* \* \*